United States Patent
Hodgkins

[19]

[11] Patent Number: 5,922,199
[45] Date of Patent: Jul. 13, 1999

[54] DOUBLE PASS FUEL FILTER ASSEMBLY

[75] Inventor: David H. Hodgkins, Modesto, Calif.

[73] Assignee: Parker Hannifin Corporation, Clevland, Ohio

[21] Appl. No.: 08/512,352

[22] Filed: Aug. 8, 1995

Related U.S. Application Data

[63] Continuation of application No. 08/122,864, Sep. 15, 1993, abandoned.

[51] Int. Cl.$^6$ .............................. B01D 27/14; B01D 27/08
[52] U.S. Cl. .......................... 210/256; 210/90; 210/130; 210/132; 210/172; 210/416.4; 210/444; 210/258; 210/315; 210/338; 210/342; 210/450
[58] Field of Search .............................. 210/90, 130, 132, 210/172, 416.4, 444, 256, 258, 315, 338, 342, 450

[56] References Cited

U.S. PATENT DOCUMENTS

| | | |
|---|---|---|
| 1,468,906 | 9/1923 | Inman . |
| 1,746,336 | 2/1930 | Breer . |
| 1,856,771 | 5/1932 | Loeffler . |
| 2,253,686 | 8/1941 | Burckhalter . |
| 2,431,782 | 12/1947 | Walton et al. . |
| 2,623,638 | 12/1952 | Dunn . |
| 2,625,114 | 1/1953 | Coffey . |
| 2,635,759 | 4/1953 | Schwalge . |
| 2,729,339 | 1/1956 | McCoy . |
| 3,040,894 | 6/1962 | Pall . |
| 3,056,503 | 10/1962 | Roosa . |
| 3,105,042 | 9/1963 | Roosa . |
| 3,363,762 | 1/1968 | Ensign . |
| 3,529,727 | 9/1970 | Bernhard . |
| 3,618,777 | 11/1971 | Meyer . |
| 3,664,509 | 5/1972 | Grill . |
| 3,900,400 | 8/1975 | Whitfield . |
| 3,931,011 | 1/1976 | Richards et al. . |
| 4,036,755 | 7/1977 | Dahm . |
| 4,052,307 | 10/1977 | Humbert, Jr. . |
| 4,427,545 | 1/1984 | Arguilez . |
| 4,462,902 | 7/1984 | Silhouette . |
| 4,465,595 | 8/1984 | Cooper . |
| 4,491,120 | 1/1985 | Hodgkins . |
| 4,502,955 | 3/1985 | Schaupp . |
| 4,502,956 | 3/1985 | Wilson . |
| 4,617,116 | 10/1986 | Seiler . |

(List continued on next page.)

FOREIGN PATENT DOCUMENTS

| | | |
|---|---|---|
| 88/24572 | 8/1990 | Australia . |
| 470440 | 2/1992 | European Pat. Off. . |
| 2201913 | 6/1974 | France . |
| 2341209 | 3/1975 | Germany . |
| 2952016 | 6/1981 | Germany . |
| 4026230 | 10/1991 | Germany . |
| 4102474 | 8/1992 | Germany . |
| 3-70861 | 3/1991 | Japan . |
| 3-105054 | 5/1991 | Japan . |
| 4-277003 | 10/1992 | Japan . |
| 8610241 | 1/1986 | WIPO . |
| 93/1874 | 2/1993 | WIPO . |

*Primary Examiner*—Thomas M. Lithgow
*Attorney, Agent, or Firm*—Renner, Otto, Boisselle & Sklar, P.L.L.

[57] ABSTRACT

A fuel filter assembly (10) has a head portion (12) and an element portion (14) enclosing a replaceable cartridge (18). The assembly has a first inlet port (22) which accepts fuel from a tank (90) and filters it by passage through a screen (43) supported on a tube (36). The fuel that has been filtered by passage through the screen is delivered from the assembly through a first outlet port (24) for delivery to a lift pump (96). Fuel from the lift pump is returned to the fuel filter assembly through a second inlet port (26). The fuel is finely filtered by passage through a loop of filter media (60). Clean fuel is delivered from a second outlet port (28) to an engine (104). Contaminants separated from the fuel by passage through the screen and the media loop are collected in first and second sump areas (78), (80) of the filter housing respectively. An alternative embodiment (110) includes a prefilter screen (158) integral with a replaceable cartridge (118).

29 Claims, 3 Drawing Sheets

U.S. PATENT DOCUMENTS

| | | |
|---|---|---|
| 4,619,764 | 10/1986 | Church et al. . |
| 4,740,299 | 4/1988 | Popoff . |
| 4,836,923 | 6/1989 | Popoff et al. . |
| 4,860,713 | 8/1989 | Hodgkins . |
| 4,904,382 | 2/1990 | Thomsen . |
| 4,909,937 | 3/1990 | Huffmann . |
| 4,933,093 | 6/1990 | Keller . |
| 4,997,555 | 3/1991 | Church . |
| 5,020,610 | 6/1991 | Lyon et al. . |
| 5,078,876 | 1/1992 | Whittier . |
| 5,078,877 | 1/1992 | Cudaback . |
| 5,084,170 | 1/1992 | Janik et al . |
| 5,114,572 | 5/1992 | Hunter . |
| 5,114,575 | 5/1992 | Yano et al. . |
| 5,149,433 | 9/1992 | Lien . |
| 5,174,892 | 12/1992 | Davis . |
| 5,207,898 | 5/1993 | Hodgkins . |
| 5,213,682 | 5/1993 | Richardson . |
| 5,231,967 | 8/1993 | Baltz . |

DOUBLE PASS FUEL FILTER ASSEMBLY

This is a continuation of application Ser. No. 08/122,864, filed Sep. 15, 1993 (now abandoned).

TECHNICAL FIELD

This invention relates to fluid filters. Specifically this invention relates to a fuel filter assembly for a vehicle that provides enhanced filtration of the fuel prior to delivery to an engine.

BACKGROUND ART

Vehicle fuel systems typically have a fuel tank for holding a supply of liquid fuel for delivery to an engine. The fuel system also includes a lift pump for pumping fuel from the tank to the engine. Some engines, particularly those that have fuel injection, also have an injection pump which raises fuel pressure beyond that produced by the lift pump so that the fuel may be injected at high pressure into the combustion chambers.

Fuel filters are included in fuel systems to remove contaminants such as dirt and water from the fuel before it reaches the engine. Fuel filters are positioned in the fuel system either on the vacuum side or the pressure side of the lift pump. Each position for the fuel filter in relation to the lift pump has advantages and drawbacks.

If the fuel filter is positioned on the vacuum side of the lift pump, it has the advantage of removing contaminants before the fuel reaches the lift pump. This protects the lift pump from contaminants and prolongs its life. The drawback associated with this position of the fuel filter is that the amount of pressure available to push fuel through the filter is limited to atmospheric pressure. As a result, severe contamination may block flow and starve other fuel system components causing damage. Loss of flow may also occur in cold temperatures when wax or ice crystals form in petroleum fuels and block flow through the filter. Fuel heaters are needed in these situations to minimize the risk of problems.

A further problem associated with placing the fuel filter on the vacuum side of a lift pump is that lift pumps sometimes fail and generate contaminants. If these contaminants are carried downstream in the fuel they may cause damage to the high pressure/fuel metering pump or the fuel injectors.

An alternative fuel system configuration is to place the filter assembly on the pressure side of the lift pump. In this position more pressure is available to push fuel through the filter which reduces the risk of fuel starvation. Also, the heat energy imparted to the fuel by the lift pump tends to make fuels flow easier. In this position the high pressure pump and fuel injectors are protected from damaging debris from failure of the lift pump.

The drawbacks of positioning the fuel filter on the pressure side of the lift pump is that the lift pump is exposed to the contaminants which may shorten its life. Further, the pumping action tends to entrain the contaminants in the fuel which makes it more difficult to filter them out when they eventually reach the fuel filter assembly.

Thus, there exists a need for a fuel filter assembly that provides better filtration while reducing the drawbacks associated with positioning the filter on only the upstream or downstream sides of the lift pump.

DISCLOSURE OF INVENTION

It is an object of the present invention to provide a fuel filter assembly that provides enhanced filtration.

It is a further object of the present invention to provide a fuel filter assembly for a fuel system that provides fluid filtration to protect both the fuel lift pump, as well as the fuel injectors, fuel injection high pressure pump, and other precision fuel metering components.

It is a further object of the present invention to provide a fuel filter assembly for a vehicle fuel system that has a filter medium that is easy to replenish.

It is a further object of the present invention to provide a fuel filter for a vehicle fuel system that provides enhanced filtration while occupying little space.

It is a further object of the present invention to provide a fuel filter assembly for a vehicle fuel system that reduces the risk of fuel starvation of downstream components.

It is a further object of the present invention to provide a fuel filter assembly for a vehicle fuel system that is economical to manufacture and service.

It is a further object of the present invention to provide a fuel filter assembly for a vehicle fuel system that reduces waste when the filter is discarded.

It is a further object of the present invention to provide a vehicle fuel system that reduces the risk of contamination reaching an engine.

Further objects of the present invention will be made apparent in the following Best Modes for Carrying Out Invention and the appended claims.

The foregoing objects are accomplished by a double pass fuel filter assembly for filtering fuel being delivered from a fuel tank to an engine. The filter assembly has a head portion that is mounted on the vehicle. The head portion has a first inlet port communicating with the tank, and a first outlet port connected to the suction port of a lift pump. The head portion further has a second inlet port in communication with the pressure port of the lift pump and a second outlet port which is in fluid communication with the engine.

The fuel filter assembly includes an element portion that is removable from the head portion. The element has a bowl shaped enclosure. The enclosure encloses a cartridge having a continuous circular loop of a first filter media and a concentric continuous loop of a second filter media. The first media loop provides preliminary filtration for fluid flowing from the first inlet port to the first outlet port. The first media loop removes large impurities and slugs of water. A relief valve extends between the first media loop and will open if the first loop becomes substantially clogged. This minimizes the risk of starving downstream fuel system components.

The second media loop removes finer contaminants that have passed through or which have been generated by the lift pump, as fuel passes through the assembly from the second inlet port to the second outlet port. In a first embodiment of the invention, the second media loop is mounted on the replaceable cartridge. The first media loop is fixably mounted to the head portion and is accepted into the cartridge upon engagement of the element portion and the head portion.

In the first embodiment, the element portion further includes first and second sump areas for collecting contaminants separated from the fuel by the first and second media loops. A drain valve provides for periodically draining the contaminants from the sump areas.

An alternative embodiment has first and second media loops that are both mounted on the replaceable cartridge. This enables replenishment of both media loops when the cartridge is changed.

BEST MODES FOR CARRYING OUT INVENTION

Figure 1:
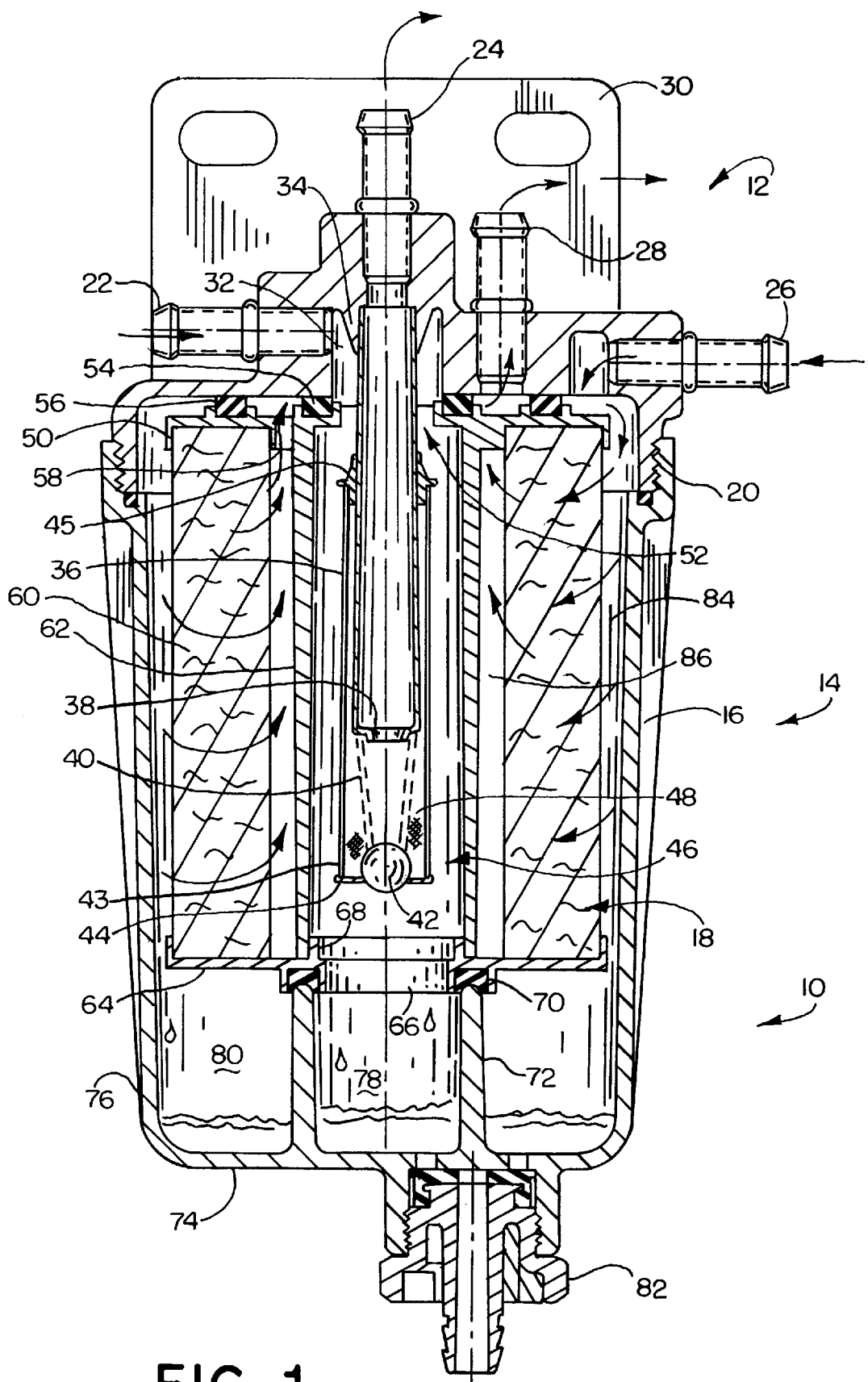
FIG. 1 is a cross sectional view of a first embodiment of the fuel filter assembly of the present invention.

Referring now to the drawings and particularly to FIG. 1, there is shown therein a first embodiment of the fuel filter assembly of the present invention generally indicated 10. The fuel filter assembly has a body, which is comprised of a head portion 12 and an element portion 14. The element portion 14 has a housing 16 that encloses a replaceable filter cartridge 18. The housing 16 is selectively attachable to the head portion by inter-engaging threads 20 on the head portion and housing.

The head portion 12 has a first inlet port 22 and a first outlet port 24. The head portion further includes a second inlet port 26 and a second outlet port 28. The head portion 12 also incorporates a bracket portion 30 that facilitates mounting the fuel filter assembly to a vehicle on which it is installed.

Head portion 12 includes a recess 32 which is in fluid communication with inlet port 22. Recess 32 includes a downward extending nipple 34. Nipple 34 is in supporting engagement with a tube 36 which extends downwards into element portion 12 and cartridge 18. A retainer lip 38 is positioned adjacent the open end of tube 36. Retainer lip 38 supports a compression spring 40 which biases a relief ball 42 in the downward direction. Ball 42 nests in an opening (not separately shown) in a cap 44.

A screen 43 extends in surrounding relation of tube 36. Screen 43 extends between cap 44 and a further cap 45 which is shown disposed upward therefrom and which is mounted on tube 36. Screen 43 serves as a first filter media means and divides a first fluid inflow area 46 which surrounds the outside of the screen from a first fluid outflow area 48 inside the screen. The fluid outflow area inside the screen is in fluid communication through tube 36 with first outlet port 24.

Cartridge 18 includes a first end cap 50. First end cap 50 has a first central opening 52 which accepts tube 36 and screen 43 therethrough when the cartridge is installed in the assembly. End cap 50 also has a first circular seal 54 and a second circular seal 56 mounted in concentric recesses formed on the end cap. Seals 54 and 56 are adapted to engage the head portion in fluid tight relation. A fluid opening 58 in the first end cap extends between seals 54 and 56.

A loop of filter media 60 is mounted in a recess on the lower face of first end cap 50. Media loop 60 is preferably high grade filter paper media of types known in the prior art. Media loop 60 is mounted to the end cap by potting compound or other suitable adhesive. An integrally formed cylindrical first wall 62 extends from first end cap 50 in the downward direction as shown in FIG. 1. The interior surface of first wall 62 bounds the first fluid inflow area 46.

Cartridge 18 further includes a second end cap 64. Second end cap 64 accepts media loop 60 in a suitable recess therein and the media loop is held to the second end cap by potting compound. Second end cap 64 includes a second central opening 66. Opening 66 is bounded by an upward projection 68 which is attached to first wall 62 in bonded fluid tight relation.

Second end cap 64 also includes a circular seal 70 housed in a downward extending recess of the end cap as shown in FIG. 1. Seal 70 is adapted for engaging an upwardly extending cylindrical wall 72. Cylindrical wall 72 extends upward from a bottom portion 74 of housing wall 76. Cylindrical wall 72 divides a first sump area 78 from a second sump area 80. A self venting drain valve 82 is threadably mounted to bottom wall portion 74 and may be selectively opened to drain impurities that collect in the first and second sump areas.

The outer surface of media loop 60 and the inner surface of housing wall 76 bound a second fluid inflow area 84. The second fluid inflow area is in direct fluid communication with second inlet port 26. Second fluid inflow area 84 is further held in fluid isolation from adjacent fluid areas by seal 56 and seal 70 at its top and bottom, respectively.

The inner surface of media loop 60 and the outer surface of first wall 62 bound a second fluid outflow area 86. Second fluid outflow area 86 is in fluid communication through fluid opening 58 in first end cap 50 with the second outlet port 28. The concentric resilient seals 54 and 56 maintain fluid separation of outflow area 86 and the adjacent first fluid inflow area 46 and second fluid inflow area 84.

Figure 5:
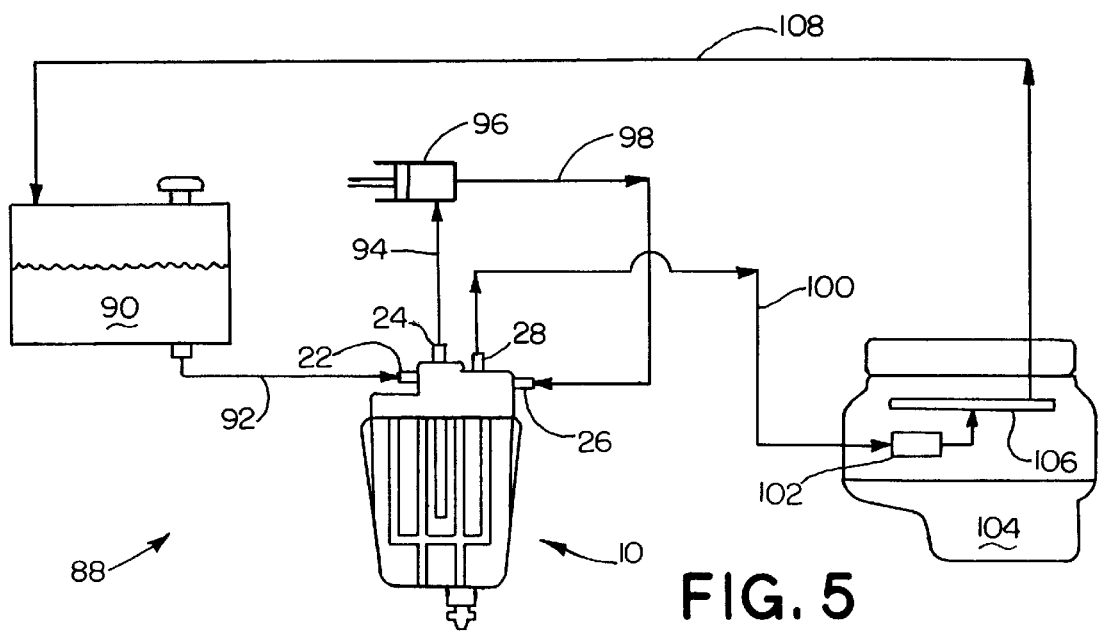
FIG. 5 is a schematic view of a vehicle fuel system including the fuel filter assembly of the present invention.

A vehicle fuel system 88 in which fuel filter assembly 10 is installed is shown in FIG. 5. The system has a fuel tank 90 for housing a supply of liquid fuel. In the embodiments of the invention shown, the fuel is typically a petroleum fuel such as diesel fuel. However, in other embodiments other combustible liquid fuels may be used. A tank outlet line 92 is connected to first inlet port 22 of the filter assembly 10. First outlet port 24 of the fuel filter assembly is connected to a line 94 which delivers fuel to a lift pump 96 shown schematically.

A lift pump outlet line 98 is connected to second inlet port 26 of the fuel filter assembly. Second outlet port 28 of the assembly is connected to an engine feed line 100. The engine feed line 100 delivers fuel to a fuel injection pump 102 of an engine 104. The fuel injection pump feeds fuel at elevated pressure to a fuel rail 106 in the conventional manner for delivery to fuel injectors which deliver the fuel to the cylinders of the engine. A return line 108 returns excess fuel from the fuel rail to the tank 90.

The operation of the fuel filter assembly 10 is now explained with respect to the components of the fuel system shown in FIG. 5. Fuel delivered from the fuel tank enters first inlet port 22 due to suction force of the lift pump or head pressure from the fuel in the tank. The fuel passes into recess 32 in the head portion and flows downward around nipple 34 into first fluid inflow area 46. The fuel passes through screen 43 which serves as first media means. As the fuel passes from the outside to the inside of the screen, large contaminants and slugs of water are removed from the fuel. These impurities collect at the surface of the screen and fall downward into the first sump area 78.

The fuel which has undergone initial filtration by passage through the screen flows in the fluid outflow area and upward through the inside of tube 36. The fuel leaves the head portion of the filter assembly through first outlet port 28. The fuel is drawn out of first outlet port by the suction produced by lift pump 96.

In severe contamination conditions, the surface of perforated screen 43 may become clogged with impurities. In this case the suction force of the lift pump is designed to overcome the force of spring 40 on relief ball 42. If flow through screen 43 is substantially blocked, ball 42 will be pulled upward off its seat in cap 44, allowing fuel to enter the first outflow area therethrough. This avoids fuel starvation of downstream components and vehicle stoppage.

Fuel that is delivered out of the fuel filter assembly through first outlet port 24 passes through the lift pump 96 and is returned to the fuel filter assembly by way of second inlet port 26. The fuel then flows into second fluid inflow area 84 and flows through media loop 60. As the fuel passes through media loop 66 from the outside to the inside, it is cleansed of small impurities. The impurities that are captured by the media loop 60 fall downward and are collected in second sump area 80.

After passing through media loop 60 the clean fuel flows through second fluid outflow area 86 and passes upwardly through fluid opening 58 in upper end cap 50. The fuel then flows circumferentially in the area between seals 54 and 56 and leaves the fuel filter assembly through second outlet port 28.

A fuel filter assembly has the advantage of providing filtration prior to fuel passing to the lift pump. This minimizes the risk that large and potentially damaging impurities will reach the lift pump. The design also serves to remove large impurities before they are broken up or emulsified by the pumping action of the lift pump. These large impurities are captured in the first sump area 78 and may be periodically drained or dumped out of the housing 16 when the cartridge is replaced.

A further advantage of the fuel filter assembly of the present invention is that by having the fuel undergo primary filtration before reaching the lift pump, the life of the fine filter media in loop 60 is prolonged.

The outer media loop 60 is preferably of a conventional paper media type and adapted to provide removal of fine particulate material and water that could prove harmful to components such as fuel injection pumps and fuel injectors. The position of media loop 60 on the downstream side of the lift pump also serves to capture materials that may enter the fuel system due to deterioration of components of the lift pump. As a result, potential damage to downstream fuel system components is minimized.

Figure 2:
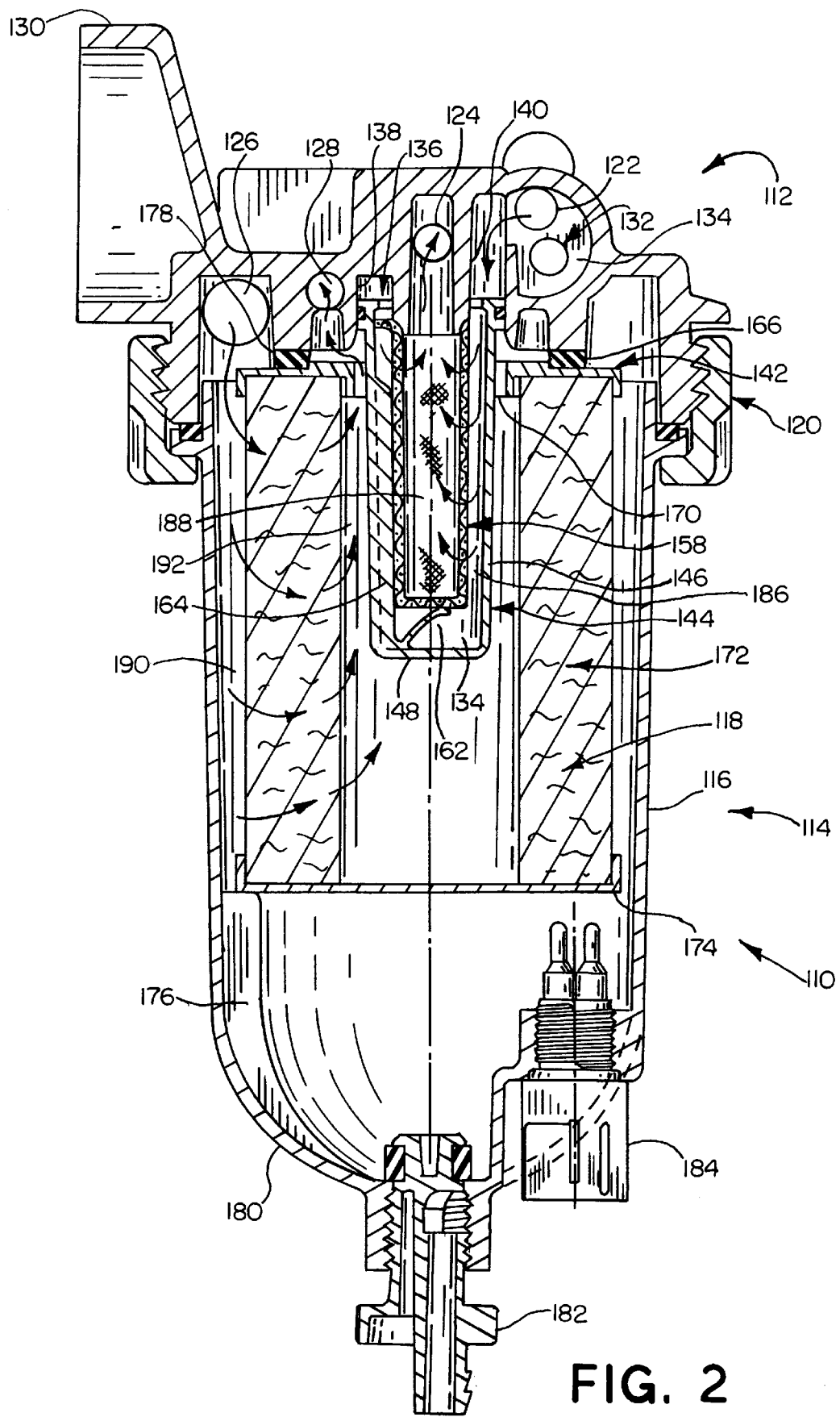
FIG. 2 is a cross sectional view of a second embodiment of the fuel filter assembly of the present invention.
Figure 3:
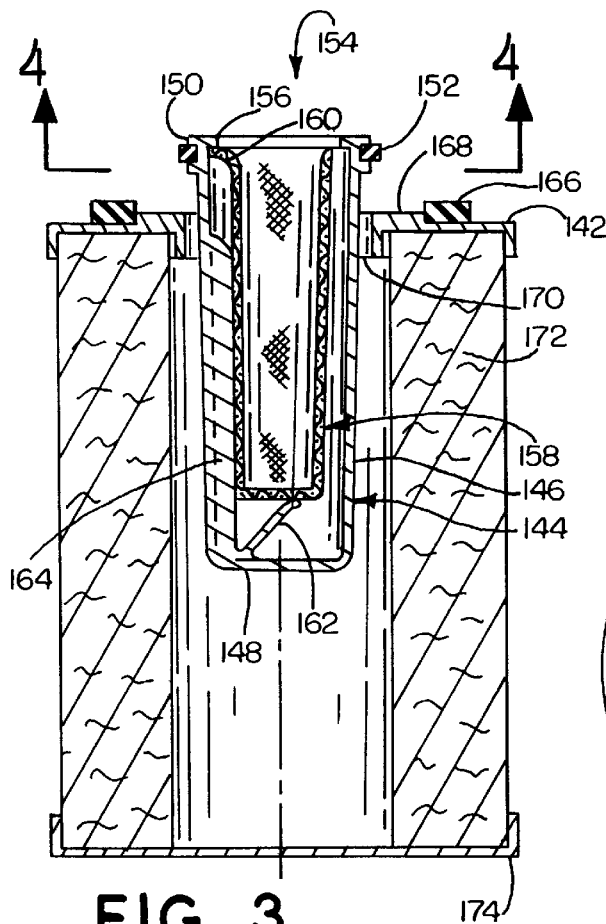
FIG. 3 is a cross sectional view of the cartridge of the second embodiment.
Figure 4:
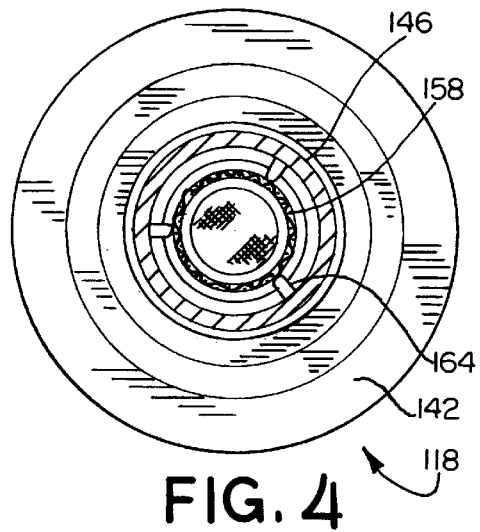
FIG. 4 is a sectional view of the cartridge taken along line 4—4 in FIG. 3.

A second embodiment of the fuel filter assembly of the present invention is shown in FIGS. 2 through 4 and is generally indicated 110. Like the first embodiment, filter assembly 110 has a head portion 112 and a detachable element portion 114. Element portion 114 includes a housing 114 that encloses a replaceable filter cartridge 118. A circumferentially extending ear/seal and threaded ring assembly 120 is used to selectively attach the element portion to the head portion.

The fuel filter assembly 110 has four ports like the first embodiment. As shown schematically in FIG. 2, head portion 112 has a first inlet 122, first outlet 124, second inlet 126 and second outlet 128. The inlets and outlets are connected to a fuel system like that shown in FIG. 5 in the manner previously discussed. The head portion also includes a mounting bracket 130. Head portion 112 also has an electrical heater 132 mounted therein. In the preferred embodiment heater 132 is a rod shaped heater that extends in a chamber 134 adjacent to the inlet 122.

Head portion 112 further includes a recess 136 which is bounded by a upward extending cylindrical wall 138. A nipple portion 140 extends downward in centered relation in recess 136. The nipple portion 140 includes a fluid passage through its central portion which is in fluid communication with first outlet 124.

Cartridge 118 is shown in greater detail in FIG. 3. Cartridge 118 includes a first end cap 142. First end cap 142 includes an integral cup shaped chamber 144. Cup shaped chamber 144 is bounded by a first cylindrical wall means 146 and a bottom wall means 148 which provide a fluid tight enclosure for the chamber. The first wall means also extends upward above the cylindrical surface of the end cap to an outwardly directed recess engaging portion 150 that is adapted to engage cylindrical wall 138. Recess engaging portion 150 includes a circular seal 152 housed in a suitable recess which insures a fluid tight seal when the cartridge is installed in abutting relation against the head portion.

First cylindrical wall means 146 has an opening 154 at its top. Opening 154 is sized for accepting nipple portion 140 therein. Opening 154 is bounded by a radially inward extending projection 156.

A filter screen 158 is movably mounted inside chamber 134. Filter screen 158 is generally cylindrical in lateral cross section and is generally u-shaped in longitudinal cross section. Screen 158 includes a plurality of outward extending projections 160 adjacent its top. The outward extending projections 160 are engagable with the inward extending projection 156 to prevent the screen 158 from passing out of the cartridge through opening 154.

A leaf spring 162 extends from the inside of bottom wall means 148 and biases screen 158 in the upward direction as shown. A plurality of guide projections 164 extend inward from first cylindrical wall means 146 to insure that screen 158 is maintained in centered relation in chamber 144 (see FIG. 4).

End cap 142 further includes a seal 166 which extends circumferentially on the end cap about a raised area 168. A plurality of openings 170 which serve as fluid passage means extend through end cap 142 intermediate of seal 166 and wall means 146.

A loop of filter media 172 extends in surrounding relation and disposed outwardly from first wall means 146. Media loop 172 is mounted in a recess in end cap 142 by potting compound or other suitable adhesive.

Cartridge 118 further includes a second end cap 174. End cap 174 is a solid disk shaped end cap. Media loop 172 is held in fluid tight relation to the second end cap 174 by potting compound or similar adhesive.

As shown in FIG. 3, when cartridge 118 is removed from abutting relation with head portion 112, spring 162 biases screen 158 outward toward opening 154. However, when the cartridge is installed in the housing and the element portion is attached to the head portion by engagement of the ear/seal ring assembly 120, the second end cap 174 is engaged and held upward by a plurality of supporting projections 176. With cartridge 118 held upward by the supporting projections, the upper portion of screen 158 engages a screen engaging portion on the bottom surface of nipple 140. As a result, filter screen 158 is held adjacent and in fluid tight relation with respect to the nipple portion by the force of spring 162. The supporting projections 176 further support the cartridge 118 so that seal 166 is compressed against a cylindrical land 178 on the head portion 112.

Housing 116 further includes a lower wall portion 180. Lower wall portion 180 has a drain valve 182 thereon from draining impurities that collect in the lower portion of the housing. The lower portion further includes an electrical water sensor probe 184. Water sensor probe 184 is connected to conventional electrical circuitry that detects an accumulation of water in the lower portion of the housing. The circuitry operates an alarm to advise the operator of the vehicle of the need to drain the unit.

In the assembled condition of the fuel filter assembly as shown in FIG. 2, screen 158 serves as a first media loop which separates a first fluid inflow area 186 on the outside of the screen from a first fluid outflow area 188 inside the screen. First fluid inflow area 186 is in fluid communication with first outlet 132 and is bounded by the wall means 146 and 148 of end cap 142. Fluid separation for the first fluid inflow area is also provided by the recess engaging portion 150 of the end cap in engagement with the cylindrical wall of the recess. First outflow area 188 is maintained in fluid separation from the first fluid inflow area by the abutting engagement of the filter screen 158 with the screen engaging portion of nipple portion 140. First fluid outflow area is in fluid communication with first outlet 124.

Media loop 172 serves to divide a second fluid inflow area 190 from a second fluid outflow area 192 inside the media loop. Second fluid inflow area 190 is in fluid communication with second inlet 126 and is bounded by the interior surface of the wall of housing 116. The second fluid outflow area 192 is bounded by the lower end cap 174 and is in fluid communication with second outlet 128 through openings 170 in upper end cap 142.

In operation of the fuel filter assembly 110, fuel from the tank enters the head portion 112 through first inlet 122. The fuel passes through chamber 134 wherein it is heated if the temperature of the fuel is such that its viscosity is too high or the temperature is sufficiently low so that ice crystals may form. Such temperature control may be accomplished through use of a temperature sensor located either in chamber 134 or in the fuel tank, which is connected to circuitry which delivers electrical current to heater 132 if the temperature is below a preset limit. In the alternative, heater 132 may be a PTC type heater which automatically begins heating as fuel temperature drops.

From chamber 134 fuel flows into cup shaped chamber 144 in end cap 142 and flows outside-in through screen 158. Screen 158 serves as a first media means for removing large impurities from the fuel. Impurities that are too large to travel through screen 158 collect in the bottom of chamber 144 where they reside until the cartridge is replaced. The fuel that passes through screen 158 to the interior area of the screen, flows upwardly through the opening in the nipple portion and out of the assembly through first outlet 124. From the first outlet fuel is delivered to a lift pump.

The fuel returns from the lift pump under pressure through second inlet 126. The fuel then passes through media loop 172 which removes fine impurities and water as the fuel flows therethrough in a outside-in fashion. Once reaching the second fluid outflow area 192 inside media loop 172, the fuel passes upward through openings 170 in end cap 142. The clean fuel then passes out of the assembly through second outlet 128 and is delivered to the downstream components and the engine in the manner previously discussed.

The second embodiment of the invention 110 has the advantage that the screen 158 which serves as first media means is replaced each time the cartridge is renewed. As a result, it is assured that the screen is clean after a cartridge change and that restriction to fuel flow is minimized. In addition, the construction of the second embodiment minimizes fuel spillage during element changes. The spent cartridge occupies little volume and reduces the amount of waste that must be discarded, as most of the components of the assembly are reused for the life of the vehicle.

Thus, the new double pass fuel filter assembly of the present invention achieves the above stated objectives, eliminates difficulties encountered in the use of prior devices, solves problems and attains the desirable results described herein.

In the foregoing description certain terms have been used for brevity, clarity and understanding. However, no unnecessary limitations are to be implied therefrom because such terms are for descriptive purposes and are intended to be broadly construed. Moreover, the descriptions and illustrations given are by way of examples and the invention is not limited to the exact details shown and described.

Having described the features, discoveries and principles of the invention, the manner in which it is operated and utilized, and the advantages and useful results attained; the new and useful structures, devices, elements, arrangements, parts, combinations, systems, equipment, operations, methods and relationships are set forth in the appended claims.

I claim:

1. A fluid filter element comprising:

a first end cap, said end cap including a first fluid opening and a second fluid opening, wherein said first and second fluid openings are generally annular and are radially disposed from each other in said end cap for external communication with fluid passages in a filter head;

a second loop of filter media, said second media loop connected at a first axial end to said end cap, whereby said second media loop separates impurities from fluid passing radially through said second media loop;

a first loop of filter media, wherein said second media loop extends in surrounding relation of said first media loop, and whereby said first media loop separates impurities from fluid flowing radially therethrough, and said first media loop has an interior flow area communicating with a third fluid opening disposed radially inwardly of said first fluid opening; and an annular wall on said end cap, said annular wall extending radially intermediate of said first and second media loops in surrounding relation of said first media loop, said annular wall and said first media loop having therebetween a first flow area communicating with said first fluid opening, said annular wall and said second media loop having therebetween a second flow area communicating with said second fluid opening, and said annular wall having an axially inner closed end and being imperforate to thereby fluidly separate said first and second flow areas.

2. A fluid filter element according to claim 1, and further comprising an annular seal supported on said end cap between said first and second fluid openings, said annular seal engageable with a filter head, whereby said seal fluidly separates said first and second fluid openings when in engagement with the filter head.

3. A filter element comprising:

a first end cap, said end cap including a first fluid inlet, a first fluid outlet, and a second fluid outlet for external communication with fluid passages in a filter head, wherein said first fluid inlet, first fluid outlet, and second fluid outlet are radially disposed from each other in said end cap;

a media loop, said media loop connected at a first axial end to said end cap, wherein said media loop separates impurities from fluid passing radially through said media loop to said second fluid outlet;

an annular filter screen, said filter screen supported on said end cap, wherein said filter screen separates impurities from fluid passing from said first fluid inlet to said first fluid outlet and wherein said media loop is in surrounding relation of said filter screen; and an imperforate annular wall on said first end cap surrounding said filter screen, said annular wall defining with said media loop a second outflow area communicating with said second fluid outlet, and said annular wall defining with said filter screen a first inflow area communicating with said first fluid inlet.

4. A filter element according to claim 3, comprising a second end cap connected to a second axial end of said media loop, wherein said second end cap and said media loop bound said second outflow area and said second fluid outlet enables fluid to pass out of said second outflow area.

5. A filter element comprising:

a first end cap, said end cap including a first fluid inlet, a first fluid outlet, and a second fluid outlet for external communication with fluid passages in a filter head, wherein said first fluid inlet, first fluid outlet, and second fluid outlet are radially disposed from each other in said end cap;

a media loop, said media loop connected at a first axial end to said end cap, wherein said media loop separates impurities from fluid passing radially through said media loop to said second fluid outlet;

an annular filter screen, said filter screen supported on said end cap, wherein said filter screen separates impurities from fluid passing from said first fluid inlet to said first fluid outlet and wherein said media loop is in surrounding relation of said filter screen;

an imperforate annular wall on said first end cap surrounding said filter screen, said annular wall defining with said media loop a second outflow area communicating with said second fluid outlet, and said annular wall defining with said filter screen a first inflow area communicating with said first fluid inlet;

a second end cap connected to a second axial end of said media loop, wherein said second end cap and said media loop bound said second outflow area and said second fluid outlet enables fluid to pass out of said second outflow area; and a cup shaped portion on one of said end caps including said annular wall, said cup shaped portion fluidly separating a first inflow area from said second outflow area.

6. A filter element according to claim 5, wherein said cup shaped portion extends in surrounding relation of said filter screen and wherein said first inflow area extends between said cup shaped portion and said filter screen, whereby fluid is enabled to pass from said first fluid inlet to said first inflow area, through said filter screen, and out of said filter element through said first fluid outlet.

7. A filter element according to claim 6, comprising a spring extending axially inward from a closed end wall of said cup shaped portion, and at least one guide projection extending radially inward from said annular wall of said cup shaped portion, and wherein said filter screen is supported in said cup shaped portion by said at least one guide projection, and said filter screen is biased toward an open end of said cup shaped portion opposite said closed end wall of said cup shaped portion by said spring.

8. A filter element according to claim 7, wherein said second fluid outlet includes a plurality of openings extending annularly around said annular wall of said cup shaped portion.

9. A filter element according to claim 8, wherein said first end cap includes a first annular seal engageable with a filter head, and said first seal fluidly divides the second fluid outlet from an area disposed radially outward from said media upon engagement with said filter head.

10. A filter element according to claim 9, wherein said cup shaped portion includes a second annular seal for engaging said filter head, and said second seal fluidly divides the first fluid outlet from said second fluid outlet upon engagement with said head.

11. A filter element according to claim 5, wherein said first end cap has a generally planar portion surrounding said cup shaped portion, and said cup shaped portion has respective inner and outer portions that project beyond said generally planar portion in axially opposite directions.

12. A filter element according to claim 11, wherein said outer portion of said cup shaped portion is surrounded by an annular seal which is engageable with a cylindrical wall portion of a filter head.

13. A fluid filter element comprising:

a first end cap, said end cap including a first fluid inlet, a first fluid outlet, and a second fluid outlet for external communication with fluid passages in a filter head, wherein said first fluid inlet, first fluid outlet, and second fluid outlet are radially disposed from each other in said end cap;

a media loop, said media loop connected at a first axial end to said end cap, wherein said media loop separates impurities from fluid passing radially through said media loop to said second fluid outlet;

an annular filter screen, said filter screen supported on said end cap, wherein said filter screen separates impurities from fluid passing from said first fluid inlet to said first fluid outlet and wherein said media loop is in surrounding relation of said filter screen;

an imperforate annular wall on said first end cap surrounding said filter screen, said annular wall defining with said media loop a second outflow area communicating with said second fluid outlet, and said annular wall defining with said filter screen a first inflow area communicating with said first fluid inlet; and a second end cap connected to a second axial end of said media loop, wherein said second end cap and said media loop bound said second outflow area and said second fluid outlet enables fluid to pass out of said second outflow area; and wherein said first end cap has a cup shaped portion including said annular wall.

14. A fluid filter element according to claim 13, wherein said filter screen is axially movable in said cup shaped portion.

15. A fluid filter element according to claim 14, comprising a resilient member operatively engaging said filter screen to bias the same in a first axial direction.

16. A fluid filter element according to claim 15, including at least one guide projection extending radially inwardly from said annular wall of said cup shaped portion which supports said filter screen radially spaced apart from said annular wall.

17. A fluid filter element according to claim 16, wherein said cup shaped portion has an open end and an inward projection at said open end which forms an axial stop against which said filter screen is biased by said resilient member.

18. A fluid filter element according to claim 17, wherein said first end cap has a generally planar portion surrounding said cup shaped portion, and said cup shaped portion projects beyond said generally planar portion in axially opposite directions.

19. A fluid filter assembly comprising a fluid filter element, a filter head, and a housing removably attached to said filter head for containing and holding said fluid filter element in operative position with respect to said filter head, said fluid filter element including:
- a first end cap, said end cap including a first fluid opening and a second fluid opening, wherein said first and second fluid openings are generally annular and are radially disposed from each other in said end cap;
- a second loop of filter media, said second media loop connected at a first axial end to said end cap, whereby said second media loop separates impurities from fluid passing radially through said second media loop;
- a first loop of filter media, wherein said second media loop extends in surrounding relation of said first media loop, and whereby said first media loop separates impurities from fluid flowing radially therethrough; and
- an annular wall on said end cap, said annular wall extending radially intermediate of said first and second media loops and fluidly separating said first and second fluid openings, and said annular wall extending in surrounding relation of said first media loop, and wherein a first inflow area extends between said annular wall and said first media loop.

20. A fluid filter assembly as set forth in claim 19, wherein said second media loop is surrounded by an radially inwardly spaced from a tubular wall portion of said housing to form a second inflow area, and said filter head includes a first inlet port, a first outlet port, a second inlet port and a second outlet port; said first inlet port being connected to said first inflow area for flow of fluid from said first inlet port to said first inflow area for flow through said first media loop to a first outflow area in fluid communication with said first outlet port, and said second inlet port being connected to said second inflow area for flow of fluid from said second inlet port to said second inflow area for flow through said second media loop of said fluid filter element to a second outflow area in fluid communication with said second outlet port.

21. A fluid filter assembly according to claim 20, comprising a second end cap connected to a second axial end of said second media loop, and wherein said second end cap and second media loop bound said second outflow area and said first fluid opening enables fluid to pass out of said second outflow area to said second outlet port.

22. A fluid filter assembly comprising a fluid filter element, a filter head, and a housing removably attached to said filter head for containing and holding said fluid filter element in operative position with respect to said filter head, said fluid filter element including:
- a first end cap, said end cap including a first fluid opening and a second fluid opening, wherein said first and second fluid openings are generally annular and are radially disposed from each other in said end cap;
- a second loop of filter media, said second media loop connected at a first axial end to said end cap, whereby said second media loop separates impurities from fluid passing radially through said second media loop;
- a first loop of filter media, wherein said second media loop extends in surrounding relation of said first media loop, and whereby said first media loop separates impurities from fluid flowing radially therethrough; and
- an annular wall on said end cap, said annular wall extending radially intermediate of said first and second media loops and fluidly separating said first and second fluid openings, and said annular wall extending in surrounding relation of said first media loop, and wherein a first inflow area extends between said annular wall and said first media loop; and
- wherein said second media loop is surrounded by and radially inwardly spaced from a tubular wall portion of said housing to form a second inflow area, and said filter head includes a first inlet port, a first outlet port, a second inlet port and a second outlet port; said first inlet port being connected to said first inflow area for flow of fluid from said first inlet port to said first inflow area for flow through said first media loop to a first outflow area in fluid communication with said first outlet port, and said second inlet port being connected to said second inflow area for flow of fluid from said second inlet port to said second inflow area for flow through said second media loop of said fluid filter element to a second outflow area in fluid communication with said second outlet port;
- wherein a second end cap is connected to a second axial end of said second media loop;
- wherein said second end cap and second media loop bound said second outflow area and said first fluid opening enables fluid to pass out of said second outflow area to said second outlet port; and
- wherein said first end cap has a cup shaped portion fluidly separating said first inflow area from said second outflow area, said cup shaped portion surrounding said first media loop, and said first inflow area extending between said cup shaped portion and said first media loop.

23. A fluid filter assembly according to claim 22, wherein said first media loop is axially movable in said cup shaped portion.

24. A fluid filter assembly according to claim 23, comprising a resilient member operatively engaging said first media loop to bias the same in a first axial direction.

25. A fluid filter assembly according to claim 24, including at least one guide projection extending radially inwardly from an annular wall of said cup shaped portion which supports said first media loop radially spaced apart from said annular wall.

26. A fluid filter assembly according to claim 25, wherein said cup shaped portion has an open end and an inward projection at said open end which forms an axial stop against which said first media loop is biased by said resilient member.

27. A fluid filter assembly according to claim 22, wherein said first end cap has a generally planar portion surrounding said cup shaped portion, and said cup shaped portion projects beyond said generally planar portion in axially opposite directions.

28. A fluid filter assembly comprising a fluid filter element according to claim 6, a filter head, and a housing removably attached to said filter head for containing and holding said fluid filter element in operative position with respect to said filter head.

29. A fluid filter assembly comprising a fluid filter element, a filter head, and a housing removably attached to said filter head for containing and holding said fluid filter element in operative position with respect to said filter head, said filter element including:
- a first end cap, said end cap including a first fluid inlet, a first fluid outlet, and a second fluid outlet, wherein said first fluid inlet, first fluid outlet, and second fluid outlet are radially disposed from each other in said end cap;
- a media loop, said media loop connected at a first axial end to said end cap, wherein said media loop separates impurities from fluid passing radially through said media loop to said second fluid outlet;

an annular filter screen, said filter screen supported on said end cap, wherein said filter screen separates impurities from fluid passing from said first fluid inlet to said first fluid outlet and wherein said media loop is in surrounding relation of said filter screen; and a second end cap connected to a second axial end of said media loop, wherein said second end cap and said media loop bound an interior area and said second fluid outlet enables fluid to pass out of said interior area;

wherein one of said end caps has a cup shaped portion fluidly separating a first inflow area from said interior area, said cup shaped portion extending in surrounding relation of said filter screen and said first inflow area extending between said cup shaped portion and said filter screen, whereby fluid is enabled to pass from said first fluid inlet to said first inflow area, through said filter screen, and out of said filter element through said first fluid outlet; and wherein said filter screen is surrounded by and radially inwardly spaced from a tubular wall portion of said housing to form a second inflow area; and said filter head includes a first inlet port, a first outlet port, a second inlet port and a second outlet port, said first inlet port being connected to said first inflow area for flow of fluid from said first inlet port to said first inflow area for flow through said media loop to a first outflow area in fluid communication with said first outlet port, and said second inlet port being connected to said second inflow area for flow of fluid from said second inlet port to said second inflow area for flow through said filter screen to a second outflow area in fluid communication with said second outlet port.

\* \* \* \* \*